(12) United States Patent
Crowther

(10) Patent No.: US 11,470,985 B1
(45) Date of Patent: Oct. 18, 2022

(54) BABY-ITEM HOLDER

(71) Applicant: Maura Crowther, Hyde Park, UT (US)

(72) Inventor: Maura Crowther, Hyde Park, UT (US)

( * ) Notice: Subject to any disclaimer, the term of this patent is extended or adjusted under 35 U.S.C. 154(b) by 0 days.

(21) Appl. No.: 17/307,963

(22) Filed: May 4, 2021

Related U.S. Application Data

(63) Continuation-in-part of application No. 29/734,071, filed on May 8, 2020.

(51) Int. Cl.
*A47D 15/00* (2006.01)
*F16M 13/02* (2006.01)
*A61J 17/00* (2006.01)

(52) U.S. Cl.
CPC ............ *A47D 15/00* (2013.01); *A61J 17/001* (2015.05); *A61J 17/1115* (2020.05); *F16M 13/022* (2013.01); *F16M 2200/06* (2013.01)

(58) Field of Classification Search
USPC ................ 248/229.1, 102, 103, 104, 105
See application file for complete search history.

(56) References Cited

U.S. PATENT DOCUMENTS

| | | | |
|---|---|---|---|
| 1,232,017 A | 7/1917 | French, Jr. | |
| 3,696,233 A * | 10/1972 | Pulsifer | F16B 2/22 219/535 |
| 4,482,117 A * | 11/1984 | Besek, Jr. | A61J 9/0661 248/103 |
| D276,939 S | 12/1984 | Pascoe | |
| D295,558 S * | 5/1988 | Jefferson | D24/194 |
| D326,524 S | 5/1992 | Lawal et al. | |
| D326,917 S | 6/1992 | Roberts et al. | |
| 5,135,189 A * | 8/1992 | Ghazizadeh | F16M 11/40 248/104 |
| D337,162 S | 7/1993 | Rollins | |
| 5,232,022 A | 8/1993 | Gougouyan | |
| 5,489,075 A * | 2/1996 | Ible | A61J 9/0692 24/298 |

(Continued)

FOREIGN PATENT DOCUMENTS

| CA | 2737813 | 10/2012 |
|---|---|---|
| EP | 2722032 | 4/2014 |

(Continued)

OTHER PUBLICATIONS

Mini cooler teether, available in Amazon.com Jan. 23, 2017, visitor May 23, 2022, available from.URL:https://amazon.cm/MAM-teething-cooler-teether-1-count/dt/B00EM5D4GQ/ref=sr_12?crid=FHW3DRRTCKQE&keyworkds=mini%2Bcooler%2Bteether&qid=1653479086&s=home....(year:2017).

*Primary Examiner* — Monica E Millner
(74) *Attorney, Agent, or Firm* — Lowenstein Sandler LLP

(57) ABSTRACT

A pacifier-securing device includes a spring clamp to hold a pacifier and a gooseneck arm connected to the spring clamp. The spring clamp includes a first arm and a second arm separated by a gap in a longitudinal direction between the first arm and the second arm, such that a mouth shield of the pacifier is held in place by a force exerted by the spring clamp in a transverse direction substantially perpendicular to the longitudinal direction. A handle of the pacifier protrudes from the spring clamp along the transverse direction, and an elongated teat of the pacifier protrudes from the spring clamp in the transverse direction opposite the handle. The gooseneck arm holds the spring clamp in a substantially fixed configuration under a weight of the pacifier.

20 Claims, 13 Drawing Sheets

(56) References Cited

U.S. PATENT DOCUMENTS

| | | | |
|---|---|---|---|
| D369,413 S * | 4/1996 | Lodewyck, Jr | D24/199 |
| D400,100 S | 10/1998 | Minard | |
| D454,957 S | 3/2002 | Colby | |
| D462,775 S | 9/2002 | Minor | |
| 6,564,403 B1 | 5/2003 | Titus | |
| 6,814,247 B2 | 4/2004 | Matthias | |
| 7,020,935 B2 | 4/2006 | Behn | |
| D559,989 S | 1/2008 | Martinelli | |
| 7,472,871 B1 | 1/2009 | Demontegnac | |
| 7,661,636 B1 * | 2/2010 | Burke | B60N 2/2845 |
| | | | 248/102 |
| 7,725,954 B2 | 6/2010 | DelPrete et al. | |
| D626,654 S | 11/2010 | Carter | |
| 7,861,985 B2 | 1/2011 | Galvin | |
| D645,969 S | 9/2011 | Del Solar et al. | |
| D666,730 S | 9/2012 | Del Solar et al. | |
| D679,406 S | 4/2013 | Del Solar et al. | |
| D690,427 S | 9/2013 | Granillo et al. | |
| D732,675 S | 6/2015 | Granillo et al. | |
| D751,130 S | 3/2016 | Burton | |
| 9,452,110 B1 * | 9/2016 | Paugh Lawrence | |
| | | | F16M 13/022 |
| 9,603,472 B2 * | 3/2017 | Newberry | A23L 7/191 |
| D797,300 S | 9/2017 | Schneider | |
| 9,764,247 B2 | 9/2017 | Sinclair-Nitschke et al. | |
| 9,883,988 B1 | 2/2018 | Kumbasi | |
| 10,172,394 B2 | 1/2019 | Hyslop | |
| 10,285,912 B2 | 5/2019 | Molina et al. | |
| D850,636 S | 6/2019 | Davidson | |
| 10,335,350 B1 | 7/2019 | Khodadadi | |
| 2003/0168561 A1 | 9/2003 | Ortiz et al. | |
| 2003/0218105 A1 | 11/2003 | Sones et al. | |
| 2005/0159779 A1 | 7/2005 | Schwartz et al. | |
| 2005/0252939 A1 | 11/2005 | Schuck | |
| 2005/0279136 A1 | 12/2005 | Bowman | |
| 2006/0168765 A1 | 8/2006 | Beatty | |
| 2008/0128459 A1 | 6/2008 | Ridler | |
| 2008/0140119 A1 | 6/2008 | Machtiger et al. | |
| 2008/0169688 A1 | 7/2008 | Funderburg | |
| 2008/0272160 A1 | 11/2008 | Vou Vakis | |
| 2009/0062082 A1 | 3/2009 | Spencer-Kramer | |
| 2009/0194571 A1 | 8/2009 | Evans | |
| 2009/0255028 A1 | 10/2009 | Weisblatt | |
| 2009/0270010 A1 | 10/2009 | Scott et al. | |
| 2010/0006714 A1 | 1/2010 | Smith | |
| 2010/0123341 A1 | 5/2010 | Furman | |
| 2011/0057084 A1 * | 3/2011 | Thompson | A63H 33/006 |
| | | | 248/314 |
| 2011/0289733 A1 | 12/2011 | Del Solar et al. | |
| 2012/0078143 A1 | 3/2012 | Hernandez et al. | |
| 2012/0104189 A1 | 5/2012 | Watson et al. | |
| 2012/0330358 A1 | 7/2012 | Ahem | |
| 2012/0267485 A1 | 10/2012 | D'Angelo, III et al. | |
| 2012/0325881 A1 | 12/2012 | White | |
| 2014/0121702 A1 | 5/2014 | Ezra et al. | |
| 2014/0332646 A1 | 11/2014 | Soderlind et al. | |
| 2015/0164749 A1 | 6/2015 | Lacroix | |
| 2017/0051871 A1 * | 2/2017 | Brzezicki | B25B 5/16 |
| 2017/0238641 A1 | 8/2017 | Chapman | |
| 2018/0021224 A1 | 1/2018 | Samadi | |
| 2019/0046415 A1 | 2/2019 | Zicafoose et al. | |
| 2020/0178716 A1 | 6/2020 | Fynbo | |
| 2021/0016196 A1 | 1/2021 | Spitzer et al. | |

FOREIGN PATENT DOCUMENTS

| | | |
|---|---|---|
| GB | 2459184 | 10/2009 |
| GB | 2561071 | 10/2018 |
| WO | 2006125610 | 11/2006 |
| WO | 2008068785 | 6/2008 |
| WO | 201603506 | 3/2016 |
| WO | 2019178297 | 9/2019 |
| WO | 2019191790 | 10/2019 |

* cited by examiner

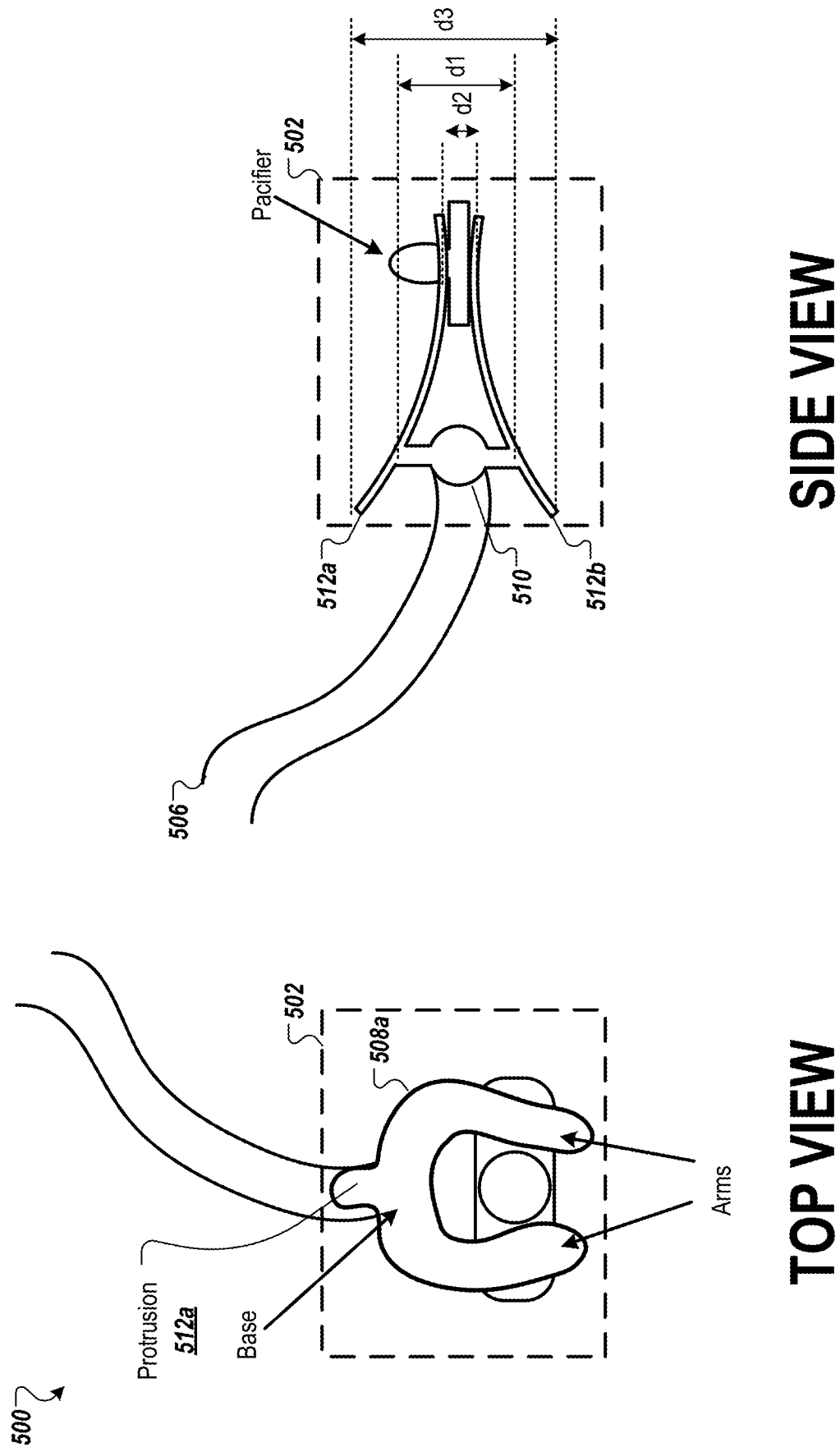

BABY-ITEM HOLDER

RELATED APPLICATIONS

This application is a continuation-in-part of U.S. Design application No. 29/734,071, filed May 8, 2020, the entire contents of which are incorporated by reference.

TECHNICAL FIELD

The present disclosure generally relates to securing a baby object, and more specifically relates to apparatuses and methods for securing a baby object.

BACKGROUND

Many adult people deal with young infants and/or toddlers on a day-to-day basis. Many infants and/or toddlers use various objects at least several times per day. The objects can be baby-specific objects, such as pacifiers, child-safe toys, baby bottles, and other similar objects. The objects may serve various purposes and also be of different shapes, materials, weights, etc.

BRIEF DESCRIPTION OF THE DRAWINGS

The present disclosure will be understood more fully from the detailed description given below and from the accompanying drawings of various implementations of the disclosure.

FIG. 5A is a top view of a clamping device of a baby-item holder according to one embodiment.

FIG. 5B is a side view of the clamping device of the baby-item holder according to one embodiment.

DETAILED DESCRIPTION

Figure 1A:
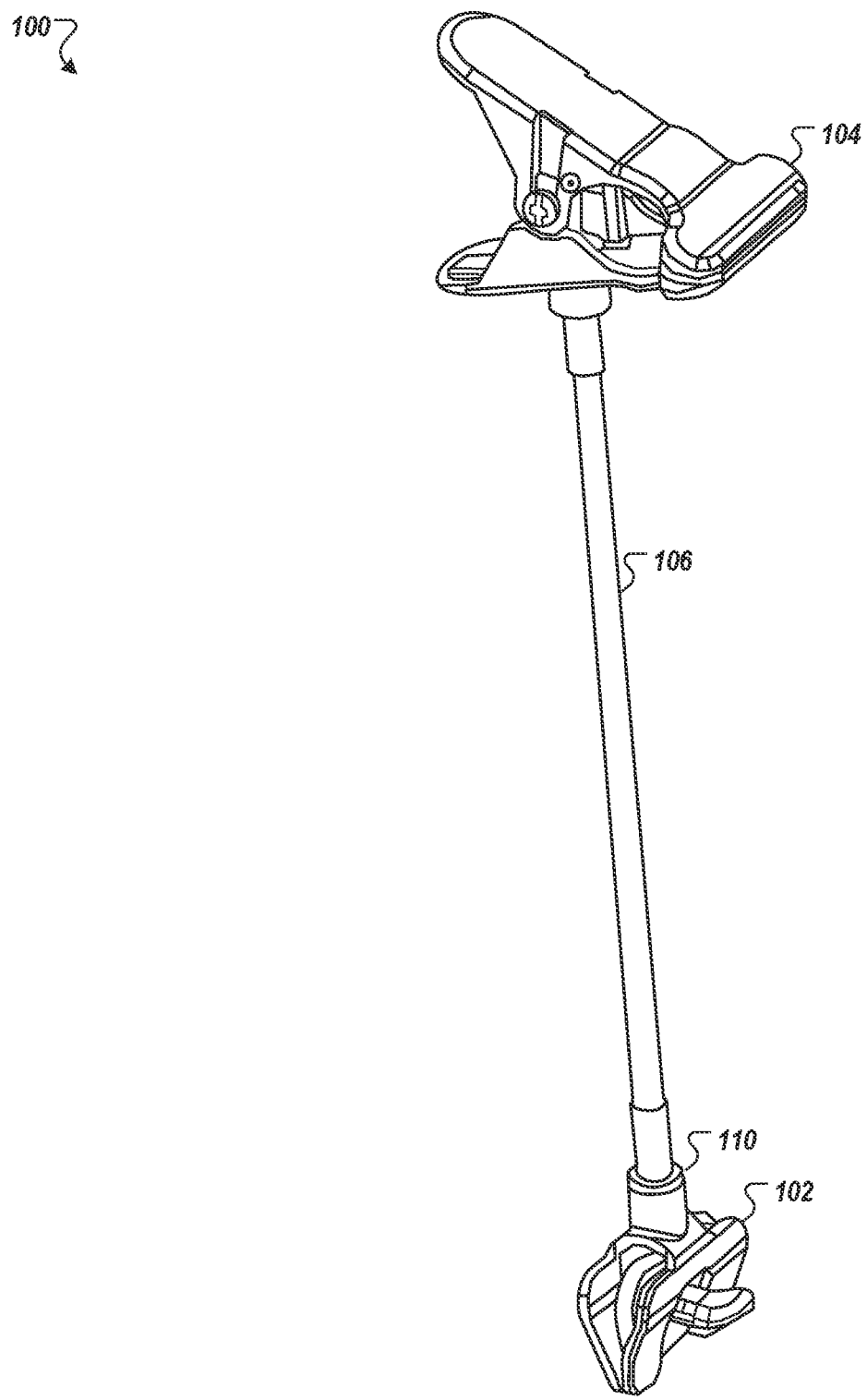
FIG. 1A illustrates a baby-item holder, including a clamping device, a clamping device, and a positioning arm according to one embodiment.

Aspects of the present disclosure are directed to a baby-item holder and/or a child-item holder. Baby-items can include various objects, such as at least, a pacifier, a baby toy, a milk bottle, and the like. For example, some babies may use pacifiers for chewing on, baby toys to entertain themselves, and/or baby bottles to drink milk, water, juice, etc. Prior to a certain age, which may depend on the specific baby, the baby may not be capable of holding or securing such items. In many cases, a responsible parent or caretaker is tasked with positioning the baby item such that it is constantly within reach of the baby, but also ensuring that the baby item is not a dangerous threat to the baby. Some solutions to securing a baby item include simply attaching the baby item to a rope or similar medium, however, such a solution still requires the parent or caretaker to return the baby item to the baby in the case that the baby should drop or otherwise lose control of the baby item. Some other solutions may require securing the baby item in a fixed position, orientation, and/or location, which is either in or out of the reach of the baby. However, such a solution may pose threats to the baby due to the baby item's immobility. For example, if a pacifier is positioned in a fixed location such that the baby can use it, the baby may not be able to spit it out when it needs to, resulting in stress for the baby, risks of suffocation, etc. In many cases, a parent and/or caretaker would like to secure the baby item, such as a pacifier, in a substantially fixed location such that the baby can use the pacifier when it wants to, but at the same time, can spit the pacifier out if it no longer wants to use it.

Aspects of the present disclosure overcome the deficiencies of conventional baby-item holders by providing a baby-item holder that can hold the baby item in a substantially fixed location in such a way that the baby can access the baby when it wants to and further the baby can stop using the baby item when it no longer wants to use it. Further, the baby-item holder can be designed for ease of use (e.g., easy securing and removable of the baby item, one-handed operation, etc.). The baby-item holder can include a semi-rigid gooseneck arm that can be attached to various objects (e.g., car seats, baby strollers, etc.) at one end, and hold a pacifier (or other baby objects) near the mouth of the baby. This may be done in such a way that the baby can suck on the pacifier while at the same time maintaining the ability to spit out the pacifier by turning its head or pushing it away with its hands. The semi-rigid gooseneck arm can support the pacifier near the baby's mouth even when the baby has spit out the pacifier, such that the baby can access the pacifier again if it wants to. The semi-rigid gooseneck arm can be bent into various configurations, thus providing the baby's caretaker flexibility to attach the baby-item holder to various surfaces and configure the baby-item holder to hold baby-items at different positions with respect to the baby, for example depending on the specific baby item being used.

In some embodiments, the baby item is a pacifier. In other embodiments, the baby item is a baby toy (such as plastic keys or various chew toys including teething devices and/or toys that a baby may chew on as their teeth begin to grow in). In further embodiments, the baby item is a baby bottle from which the baby can drink milk, water, juice, or the like. In some embodiments, the baby item may be one or more of plastic keys, rattling toys, teething toys, educational toys, dolls, stuffed animals, or the like. In some embodiments, the baby-item holder may be used to secure other devices, such as cell phones, tablets, handheld electronics, or the like, for example, when a baby or toddler may be watching a show/movie or playing games. In some embodiments, the baby-item holder may be configured to organize and secure other devices, such as oxygen tanks, cords, cables, monitors, and the like, for example, when a baby may be sick and require medical monitoring or otherwise In one embodiment, the baby-item holder may be a pacifier-securing device that can include a spring clamp to hold the pacifier, a gooseneck arm connected to the spring clamp, and an attachment device. The attachment device may be connected to the gooseneck arm at a first end of the gooseneck arm, and the spring clamp may be connected to the gooseneck arm at a second end of the gooseneck arm, opposite the first end. The attachment device can be one of a spring clamp, a clasp, a buckle, or the like, configured to attach the pacifier-securing device to a device such as a car seat, a baby stroller, a crib, a baby bouncer, etc. In some embodiments, the baby-item holder may be configured or designed to be attached to each of these devices, as well as other devices. The gooseneck arm can hold the spring clamp in a substantially fixed location under a weight of the pacifier. For example, the gooseneck arm may be configured to secure the pacifier proximate to a baby's mouth area. The spring clamp can include a first arm and a second arm that are separated by a gap in a longitudinal direction between the first arm and the second arm, such that a mouth shield of the pacifier can be held in place by a force exerted by the spring clamp in a transverse direction that is substantially perpendicular to the longitudinal direction. A handle of the pacifier may protrude from the spring clamp along the transverse direction, and an elongated teat of the pacifier may extend or protrude perpendicularly from the spring clamp in the transverse direction opposite from the handle. It should be noted that in the following description, the baby-item holder is often directed towards a case in which the baby item is a pacifier, however, it will be apparent to one skilled in the art that the description of the baby-item holder may be applied to any baby item and/or other items or objects that are intended to be held in a substantially fixed position while still allowing for the possibility of slight and relatively easy corrections in terms of the position while supporting a weight of the object.

In some embodiments, the baby-item holder may be designed to hold baby items for a baby aged between approximately three months to three years. However, in other embodiments, the baby-item holder may be used for younger babies, or older toddlers/children.

FIG. 1A illustrates a baby-item holder 100, including a clamping device 102, a clamping device 104, and a positioning arm 106 according to one embodiment. The clamping device 102 can be connected to a first end of the positioning arm 106 and can secure a baby item. The clamping device 104 can be connected to a second end of the positioning arm 106 opposite the first end and can be configured to connect the baby-item holder 100 to a structure. The positioning arm 106 can be configured to position the baby item within reach of a baby. The structure is typically fixed and stationary with respect to the baby (e.g., a baby may be strapped into a car seat or a baby stroller, or the baby may be confined to a crib or other enclosed structure).

The positioning arm 106 can have flexible tubing and may be a gooseneck arm, a semi-rigid cable, a formable cable, or other pliable material and can substantially retain its shape when bent. The positioning arm 106 may be coated by at least one of silicone, rubber, rope, metal, plastic beads, wooden beads, flexible tubing, etc.

The clamping device 102 can include a connector base 110 coupled to the positioning arm 106. The clamping device 102 can further include a first U-shaped member and a second U-shaped member (not explicitly shown in FIG. 1A, but illustrated in FIGS. 1B-1C). Each U-shaped member can include a base and arms extending distally away from the base. For example, each U-shaped member can include a first arm, a second arm, and a base which collectively form the U-shaped member. Each U-shaped member can be connected to the connector base 110 to be coupled to the positioning arm 106. In some embodiments, the connector base, the first U-shaped member, and the second U-shaped member may be integral and/or formed of a single piece of material. Each U-shaped member's arms can extend out from the connector base and taper towards each other at the distal ends of the first U-shaped member and the second U-shaped member. The connector base can be such that the base of the first U-shaped member and the base of the second U-shaped member can be separated by a first distance; the first arm of the first U-shaped member and the first arm of the second U-shaped member can be separated by a second distance, and the second arm of the first U-shaped member and the second arm of the second U-shaped member can also be separated by the second distance. The second distance may be less than the first distance to secure the baby item when the clamping device 102 is in a closed position. In particular, the second distance may be designed to be approximate to a width of the baby item to secure the baby item. In some embodiments, the connector base may be curved between where the first U-shaped member couples to the connector base and where the second U-shaped member couples to the connector base.

Each U-shaped member may be configured to rotate about a point (or fulcrum) of the connector base 110 such that a baby item such as a pacifier may be secured between the two U-shaped members when the clamping device is in a closed position. For example, the baby item may be placed between the two U-shaped members when the clamping device 102 is in an open position, and the baby item may be secured by the clamping device 102 in the closed position. In one embodiment, the connector base includes a spring to force the distal ends of the first U-shaped member and the second U-shaped member to clamp together when the clamping device 102 is in a closed position. In such a case, an external force, such as from a user, may be exerted on the clamping device 102 to open the clamping device 102, and the clamping device is returned to a closed position when the external force is removed. The spring can be one of a number of appropriate types of springs, such as a torsion spring, a spiral spring, a compression spring, a leaf spring, etc. In another embodiment, the connector base may be a friction-based clamp. The connector base can be configured to provide sufficient friction at the axes of rotation of the U-shaped members to force the distal ends of the first U-shaped member and the second U-shaped member to clamp together. In this case, an external force, such as from a user, may be exerted to open and/or close the clamping device, but the clamping device remains in the open position, the closed position, or any position in between, when the external force is removed.

In some embodiments, the clamping device 102 may be one of a spring clamp, a clasp, a buckle, a strap, or other attachment devices that can be used to secure the baby item to the clamping device 102. In some embodiments, the clamping device 104 may be one of a spring clamp, a clasp, a buckle, a strap, or other attachment devices that can be used to attach the positioning arm to a structure.

Figure 1B:
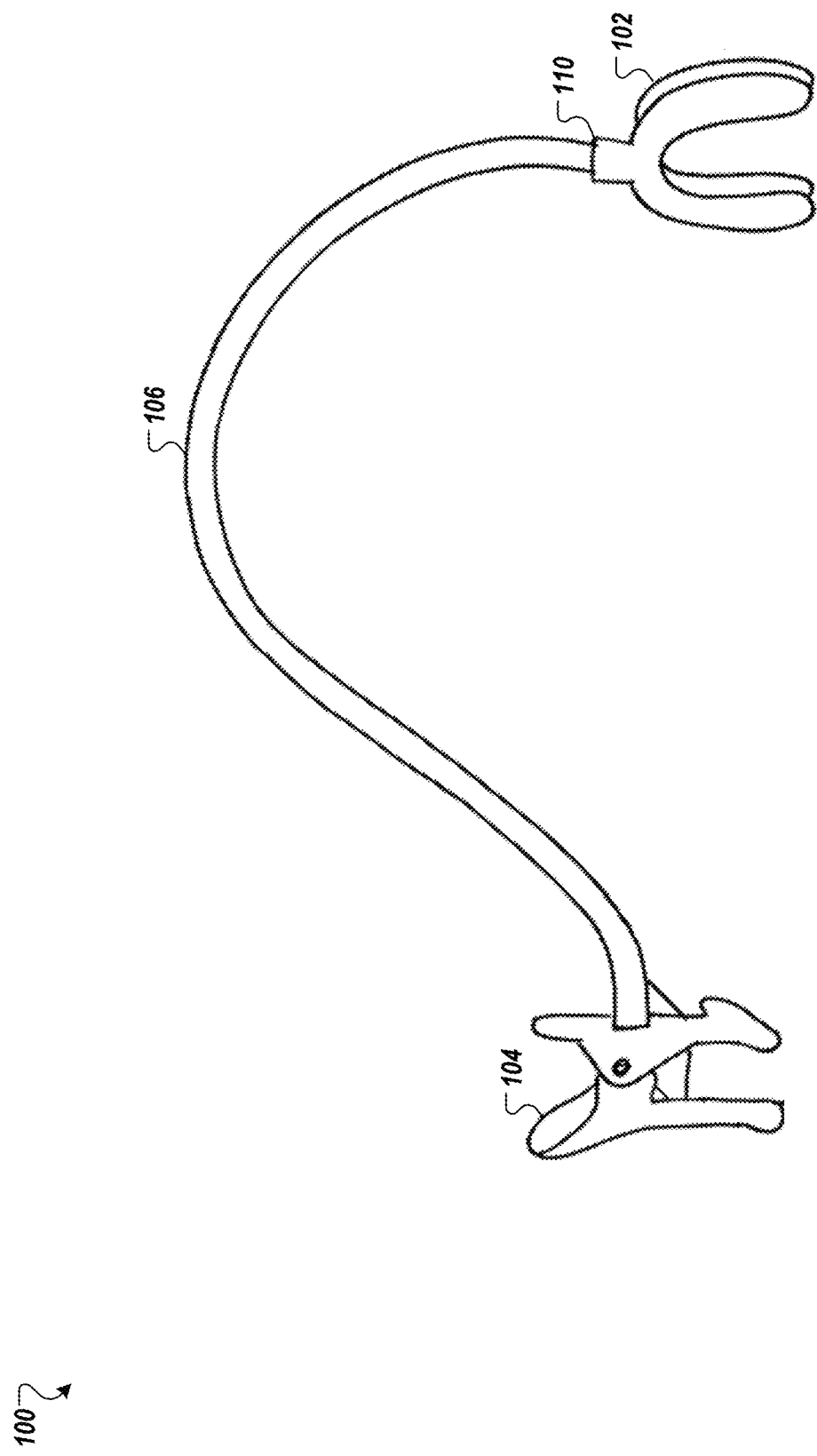
FIGS. 1B-1C illustrate the baby-item holder of FIG. 1A in a various bent configurations according to embodiments.
Figure 1C:
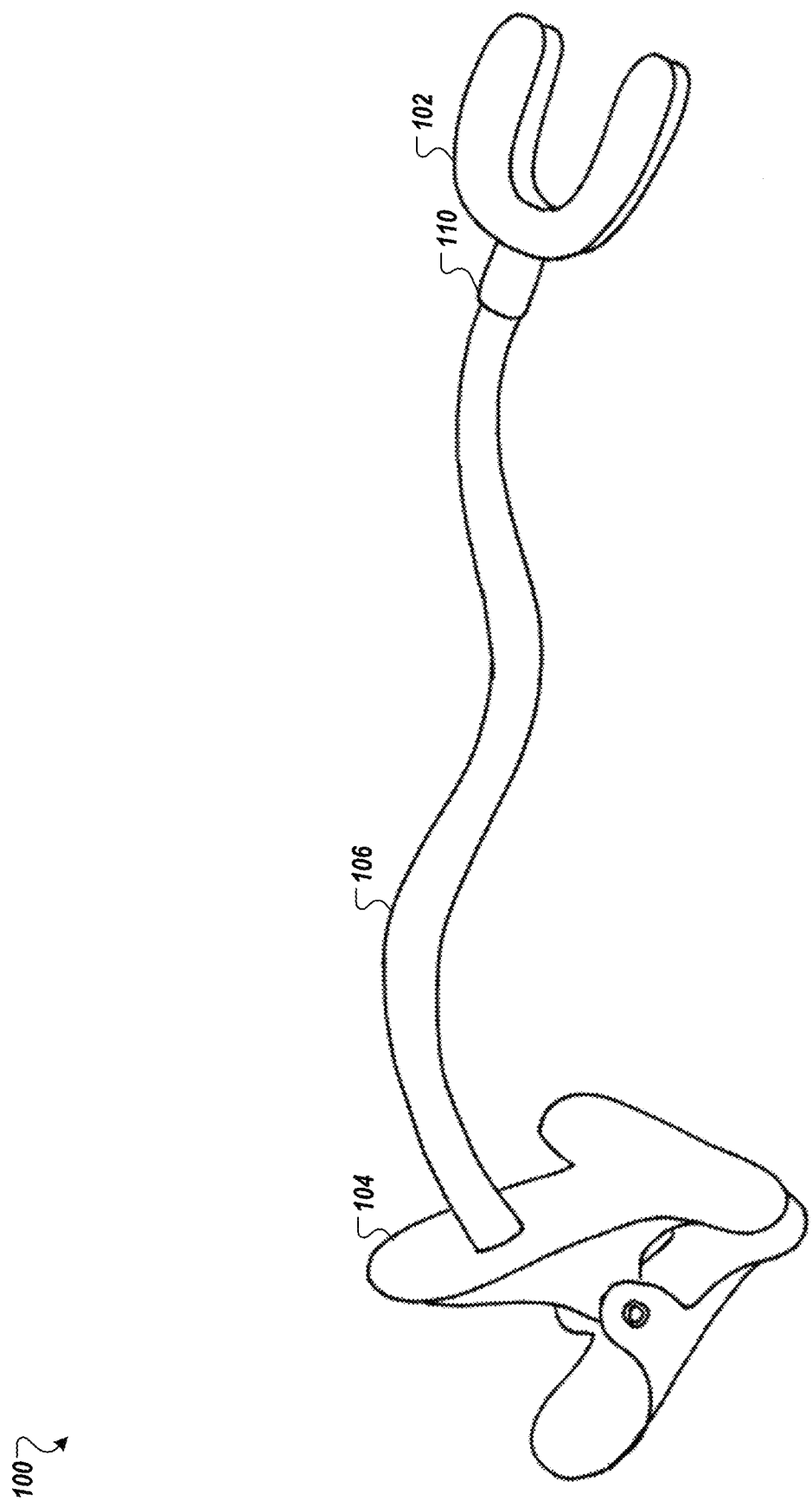

FIGS. 1B-1C illustrate the baby-item holder 100 of FIG. 1A in a various bent configurations according to embodiments. It should be noted that the configurations of the baby-item holder 100 are exemplary configurations and do not limit the various configurations of the baby-item holder 100.

Figure 1D:
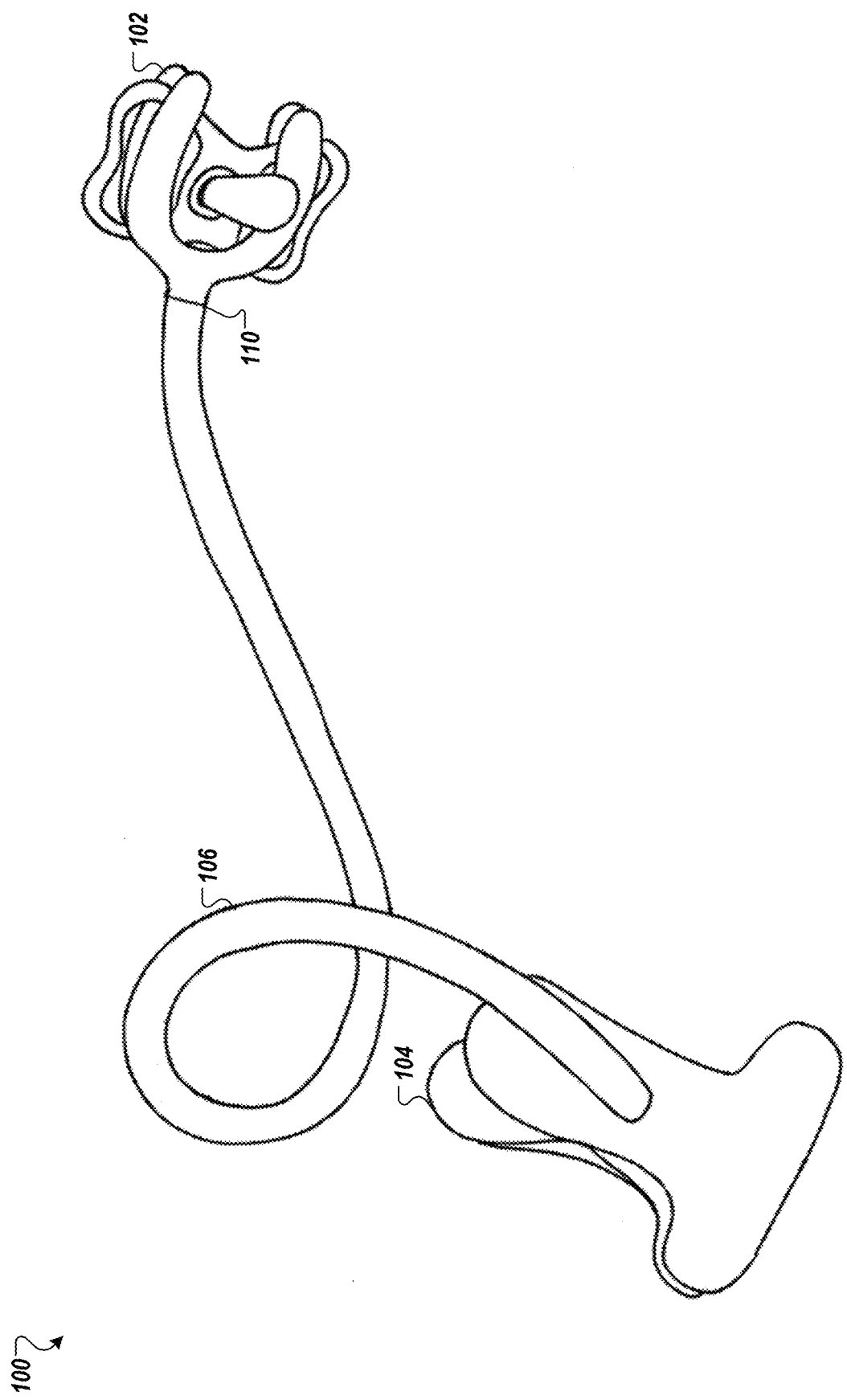
FIG. 1D is a schematic diagram of the baby-item holder of FIGS. 1A-1C securing baby-item according to one embodiment.

FIG. 1D is a schematic diagram of the baby-item holder 100 of FIGS. 1A-1C securing baby-item according to one embodiment. As depicted in FIG. 1D, the object is a pacifier.

Figure 1E:
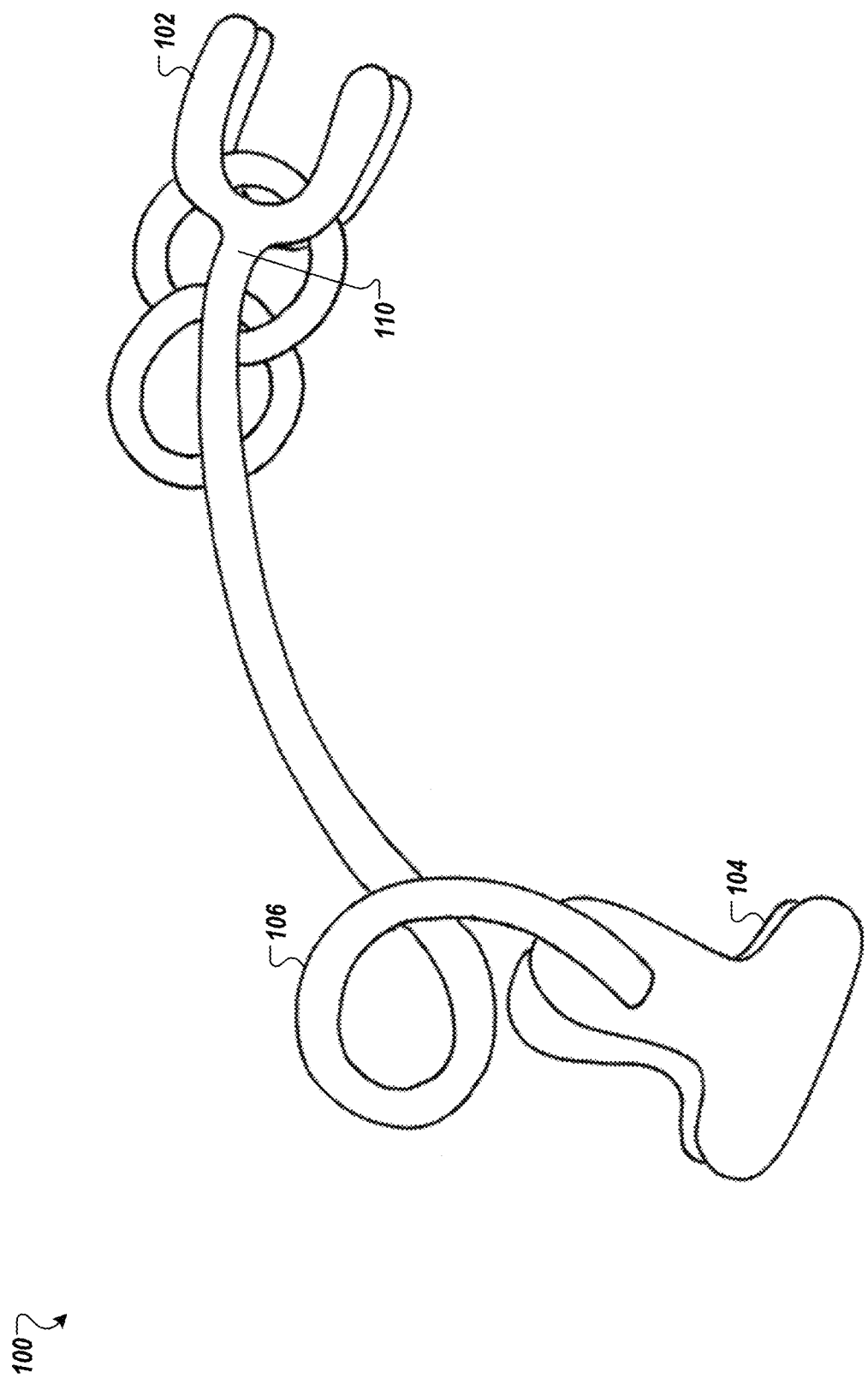
FIG. 1E is a schematic diagram of the baby-item holder of FIGS. 1A-1C securing baby-item according to one embodiment.

FIG. 1E is a schematic diagram of the baby-item holder 100 of FIGS. 1A-1C securing baby-item according to one embodiment. As depicted in FIG. 1E, the object is a baby chew-toy (ring).

Figure 2:
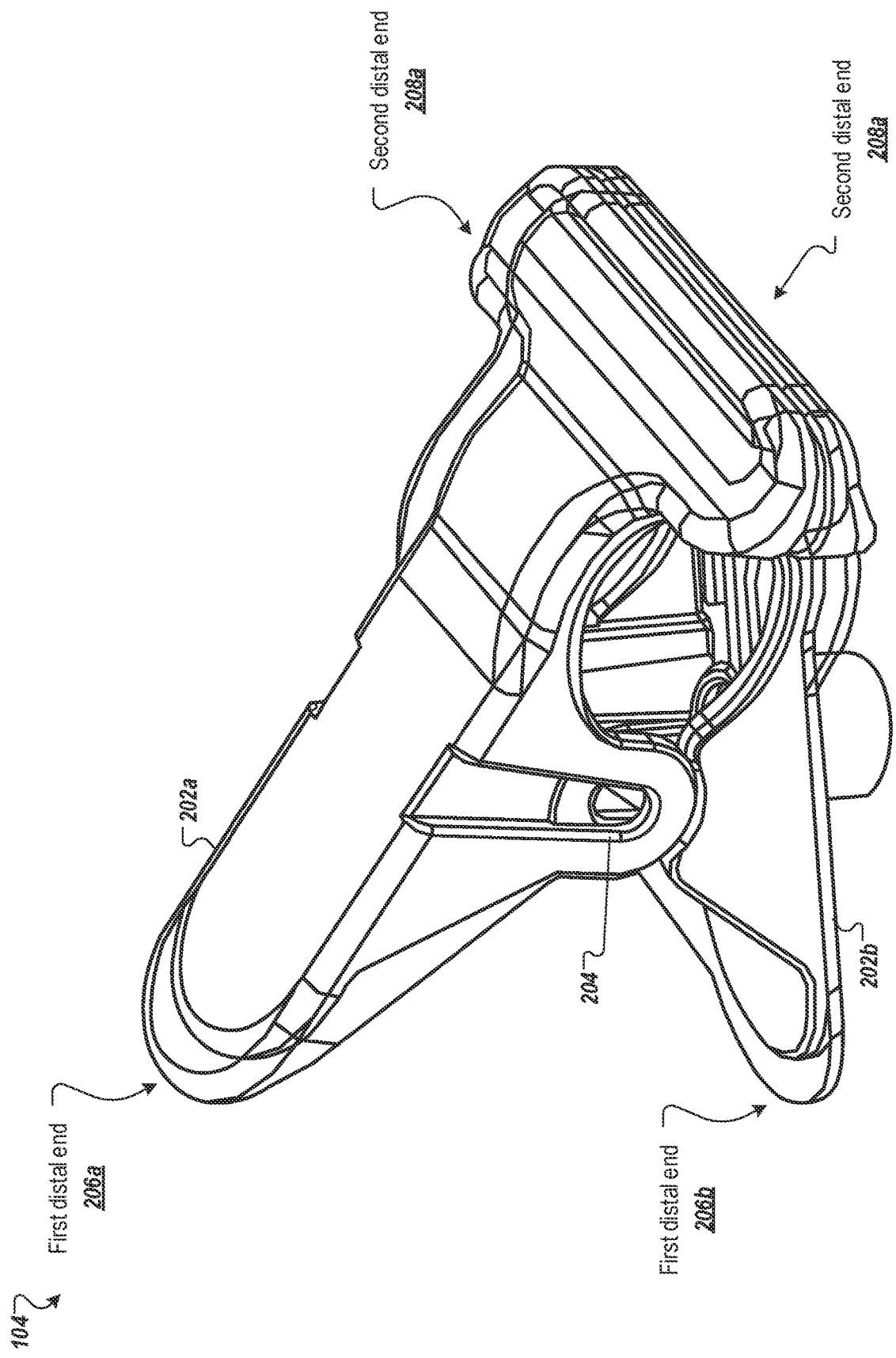
FIG. 2 is a close-up illustration of the clamping device of FIGS. 1A-1C to secure the baby-item holder 100 to a structure according to one embodiment.

FIG. 2 is a close-up illustration of the clamping device 104 of FIGS. 1A-1C to secure the baby-item holder 100 to a structure according to one embodiment. The clamping device 104 may include a first member 202a and a second member 202b connected by a fulcrum 204. The first member 202a and the second member 202b may be oriented opposite to each other (e.g., mirrored). The members 202 can be configured to rotate about an axis of rotation provided by the fulcrum 204. Each of the members 202 can include a first distal end 206, and a second distal end 208 that extends distally away from the fulcrum 204 in opposite directions. In one embodiment, the first member 202a and the second member 202b are connected by a spring (such as a compression spring, a torsion spring, a spiral spring, or the like, not illustrated in FIG. 2) in addition to the fulcrum 204. By lever action, when an external force is exerted (e.g., in opposition of a spring force exerted by the spring) on the first distal end 206a and on the first distal end 206b to force them closer to each other, the second distal end 208a and the second distal end 208b are forced further from each other (e.g., an open position). When the external force is removed, the second distal end 208a and the second distal end 208b are forced together by the spring force (e.g., a closed position), thus allowing the clamping device 104 to be secured to a structure. In another embodiment, the clamping device 104 may be held either in the open position or the closed position by friction (for example, at the fulcrum 204), which may be sufficient to secure the clamping device 104 to the structure.

In some embodiments, each member 202 may include a curvature such that when the clamping device 104 is in a closed position, an opening is formed. The opening may be approximately circular to accommodate securing the clamping device 104 to various structures, such as car seat and/or stroller handles, crib railings, baby-bouncer structures, and the like. Surfaces of the opening may include rubber, silicone, gratings, or the like to provide additional friction between the surface of the opening and the various structures. The clamping device can be constructed of one or more materials, including metal, rubber, plastic, silicone, metal, or the like.

Although illustrated and described as in FIG. 2, the clamping device 104 can have various other configurations, depending on the type of structure that the baby-item holder is to be attached to. In some embodiments, the clamping device may be a screw clamp, a cam-action clamp, a hinged clamp, a two-way clamp, a toggle-action clamp, a strap clamp, or the like.

Figure 3:
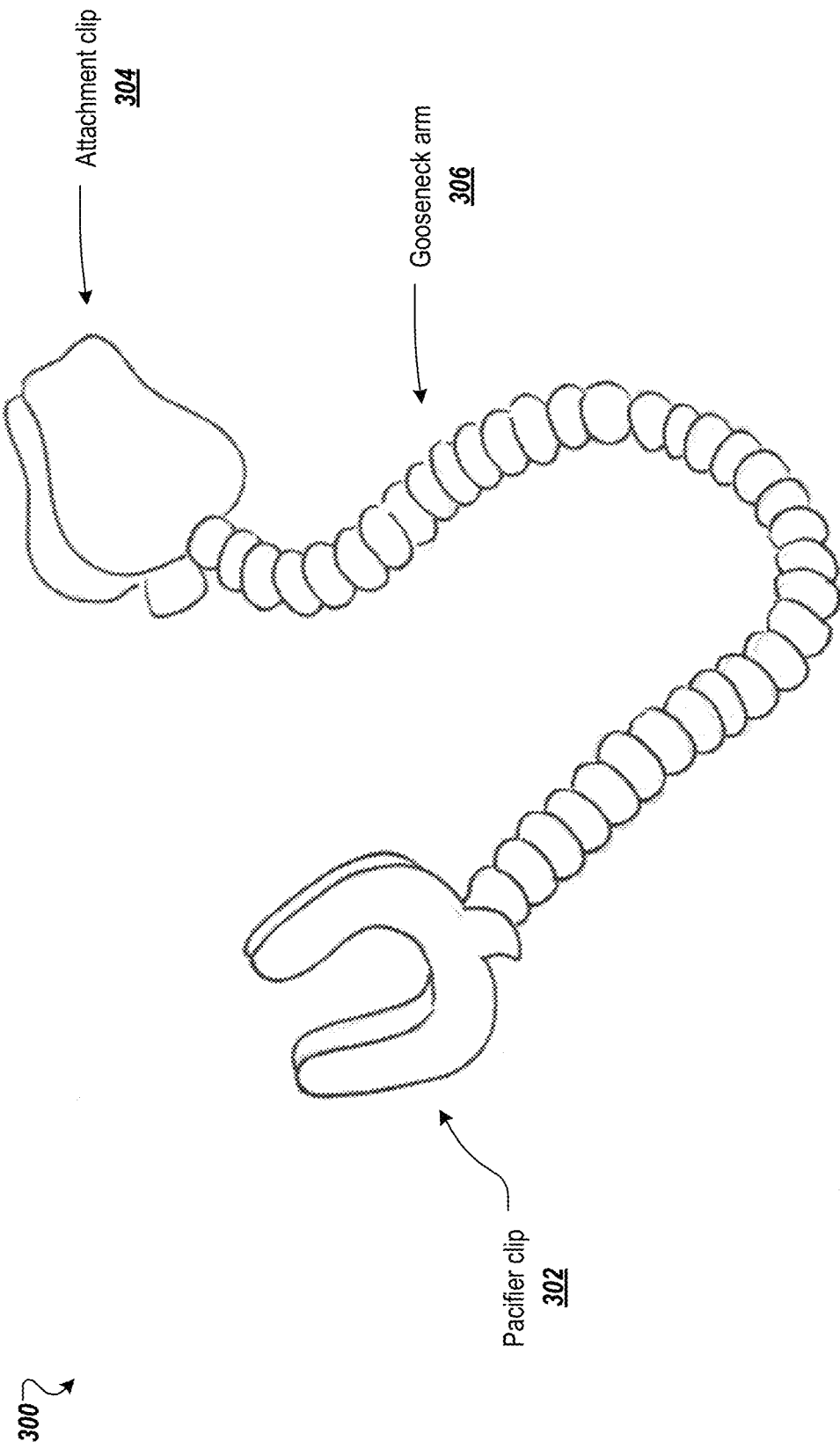
FIG. 3 illustrates a baby-item holder, including a pacifier clip, an attachment clip, and a gooseneck arm according to one embodiment.

FIG. 3 illustrates a baby-item holder 300, including a pacifier clip 302, an attachment clip 305, and a gooseneck arm 306 according to one embodiment. The baby-item holder 300 may be the same or similar to the baby-item holder 100 of FIGS. 1A-1C, as noted by similar reference numbers. For example, the clamping device 102 may be the pacifier clip 302 in some embodiments. The clamping device 104 may be the attachment device 304 in some embodiments. The positioning arm 106 may be the gooseneck arm 306 in some embodiments.

The pacifier clip 302 can be connected to a first end of the gooseneck arm 306 and can secure a pacifier. The attachment device 304 can be connected to a second end of the gooseneck arm opposite the first end and can be configured to connect the baby-item holder 300 to a structure. The gooseneck arm 306 can be configured to position the pacifier within reach of a baby. The gooseneck arm 306 may be sufficiently rigid such that the pacifier may be positioned proximate to the mouth of the baby while under the weight of the pacifier. The gooseneck arm 306 may be sufficiently pliable such that when the baby is sucking on the pacifier, the baby can spit the pacifier out by turning its head or pushing the pacifier away with its arms. Further, the gooseneck arm 306 can be bent into a given configuration and maintain the given configuration under the pacifier's weight. The gooseneck arm 306 can be made of a formable material that can substantially retain its shape when bent. The gooseneck arm 306 may be coated with at least one of silicone, rubber, rope, metal, plastic beads, wooden beads, etc.

Figure 4:
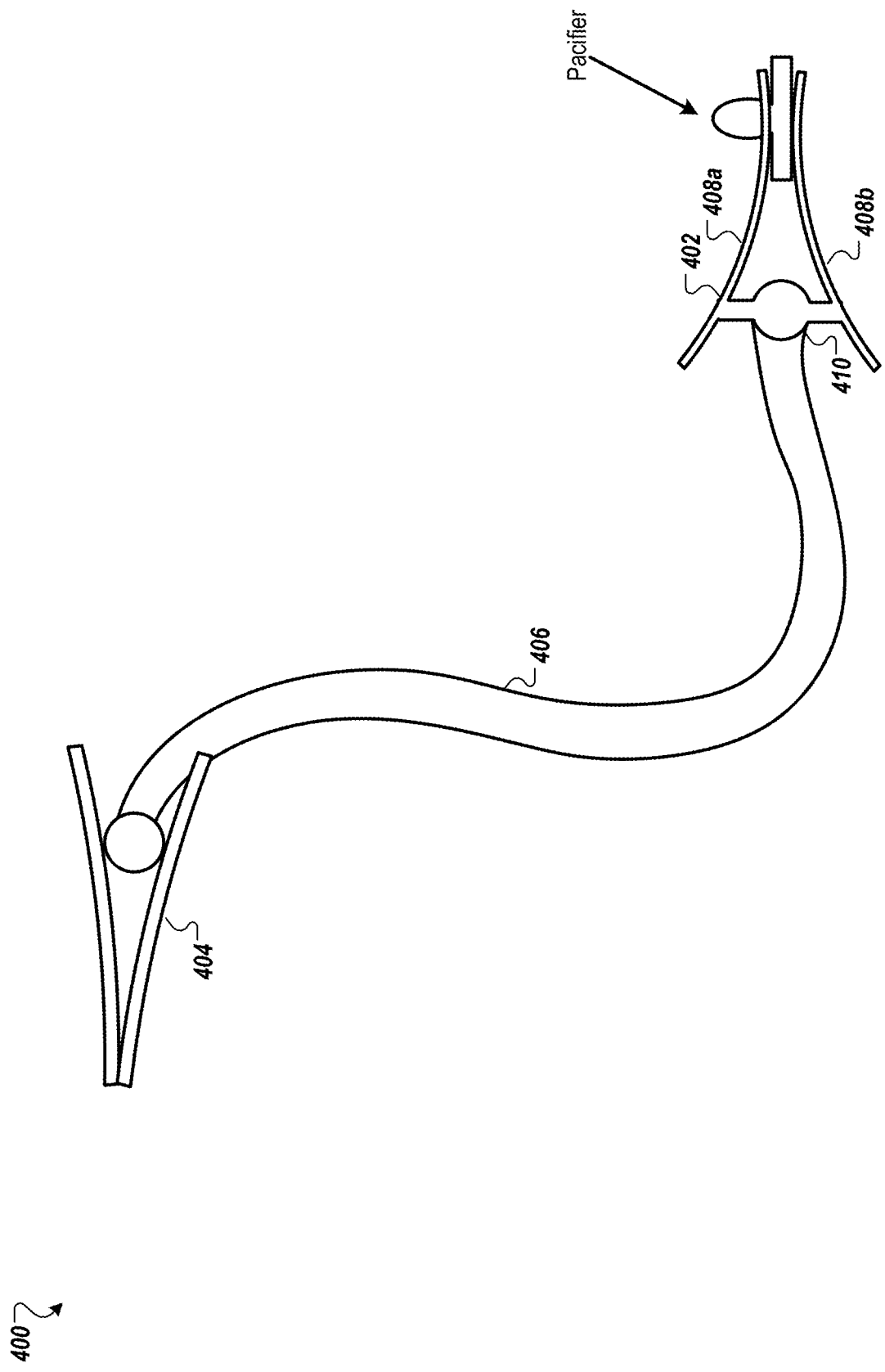
FIG. 4 is a side view of a baby-item holder, including a clamping device, a clamping device 404, and a positioning arm according to one embodiment.

FIG. 4 is a side view of a baby-item holder 400, including a clamping device 402, a clamping device 404, and a positioning arm 406 according to one embodiment. The baby-item holder 400 may be the same or similar to the baby-item holder 100 of FIGS. 1A-1C, as noted by similar reference numbers. The clamping device 404 may be the same or similar to the clamping device 104 of FIG. 2.

The clamping device 402 can include a connector base 410 coupled to the positioning arm 406. The clamping device 402 can include a first member 408a coupled to the connector base 410 and coupled to a first end of the positioning arm 406. The clamping device 402 can include a second member 408b coupled to the connector base 410 and coupled to the first end of positioning arm 406. Portions of the first member 408a and the second member 408b may extend out from the connector base 410 and taper towards each other at distal ends of the first member 408a and the second member 408b. In some embodiments, the first member 408a has a first curvature and the second member 408b has a second curvature. In some embodiments, the first member 408a and the second member 408b are oriented such that the second curvature is opposite to the first curvature. In some embodiments, the first member 408a and the second member 408b are identical, and the clamping device 402 is configured such that the second member 408b is mirrored to the first member 408a. In one embodiment, the first member 408a has a U-shape, for example, to hold a pacifier such that an elongated teat of the pacifier protrudes from the clamping device 402 so that a baby can access it. In some embodiments, the second member 408b also has a U-shape, and in other embodiments, the second member 408b may have a substantially rectangular, triangular, ellipsoidal, or other shapes against which the first member 408a can be clamped to secure the pacifier by a mouth shield of the pacifier.

FIG. 5A is a top view of a clamping device 502 of a baby-item holder 500 according to one embodiment. The baby-item holder 500 may be the same or similar to the baby-item holders 100, 300, and 400 of FIGS. 1-4 as noted by similar reference numbers. The clamping device 502 may be the same or similar to the clamping devices of FIGS. 1-4 (e.g., 102, 302, and 402).

The clamping device 502 can include a connector base (not shown in FIG. 5A) coupled to a positioning arm 506. The clamping device 502 can include a first U-shaped member 508a coupled to the connector base and coupled to a first end of the positioning arm 506. The clamping device 502 can include a second U-shaped member (not shown in FIG. 5A) coupled to the connector base and coupled to the first end of positioning arm 506. Arms of the first U-shaped member 508a and the second U-shaped member may extend out from the connector base and taper towards each other at distal ends of the first U-shaped member 508a and the second U-shaped member. The first U-shaped member 508a can have a first base, a first arm, and a second arm that collectively form the first U-shaped member 508a. The second U-shaped member can have a second base, a third arm, and a fourth arm that collectively form the second U-shaped member.

The first U-shaped member 508a may further include a first protrusion 512a that extends distally away from the first base. The second U-shaped member may further include a protrusion (not shown in FIG. 5A) that extends distally away from the second base. The first protrusion 512a and the second protrusion may help a user open the clamping device 502 to secure the baby item (e.g., pacifier). The protrusions may facilitate the baby-item holder's use, for example, by allowing the baby-item holder to be open and closed with one hand.

In some embodiments, the first U-shaped member 508a has a first curvature, and the second U-shaped member has a second curvature. In some embodiments, the first U-shaped member 508a and the second U-shaped member are oriented such that the second curvature is opposite to the first curvature. In some embodiments, the first U-shaped member 508a and the second U-shaped member are identical, and the clamping device 502 is configured such that the second U-shaped member is mirrored to the first U-shaped member 508a. In one embodiment, the first U-shaped member 508a can hold a pacifier such that an elongated teat of the pacifier protrudes from the clamping device 502 such that the elongated teat can be accessed by a baby Although the second U-shaped member is described here as having a U-shape, in some other embodiments, the second U-shaped member may not actually have a U-shape and instead may have a substantially rectangular, triangular, ellipsoidal, or other shapes against which the first U-shaped member 508a can be clamped to secure the pacifier by a mouth shield of the pacifier. Further, although the first U-shaped member 508a is described here as having a U-shape, in some other embodiments, the first U-shaped member may not actually have a U-shape and instead may have a different shape which allows for the elongated teat of the pacifier to protrude or extend perpendicularly from the clamping device 502 such that the elongated teat can be accessed by a baby. For example, the first member may have a donut shape, a V-shape, or the like.

FIG. 5B is a side view of the clamping device 502 of the baby-item holder 500 according to one embodiment. FIG. 5B illustrates the positioning arm 506, the first U-shaped member 508a, the second U-shaped member 508b, the connector base 510, the first arm, the first base, the third arm, the second base, the first protrusion 512a, and the second protrusion 512b.

In a closed position of the clamping device 502, the first base of the first U-shaped member 508a and the second base of the second U-shaped member 508b may be separated by a first distance (d1) in a direction substantially perpendicular to the surfaces of the first base and the second base. The first arm of the first U-shaped member 508a and the third arm of the second U-shaped member 508b may be separated by a second distance (d2), in a direction substantially perpendicular to the surfaces of the first arm and the third arm. The second arm (not shown in FIG. 5B) of the first U-shaped member 508a and the fourth arm (not shown in FIG. 5B) of the second U-shaped member 508b may be separated the second distance in a direction substantially perpendicular to the surfaces of the second arm and the fourth arm. The first protrusion 512a and the second protrusion may be separated by a third distance (d3) (in a direction substantially perpendicular to the surfaces of the first protrusion 512a and the second protrusion) that is greater than the first distance. Each of the first distance, the second distance, and the third distance may depend on whether the clamping device 502 is in an open position or a closed position, whether or not an item is being secured in the closed position, and what the secured item may be.

Figure 6A:
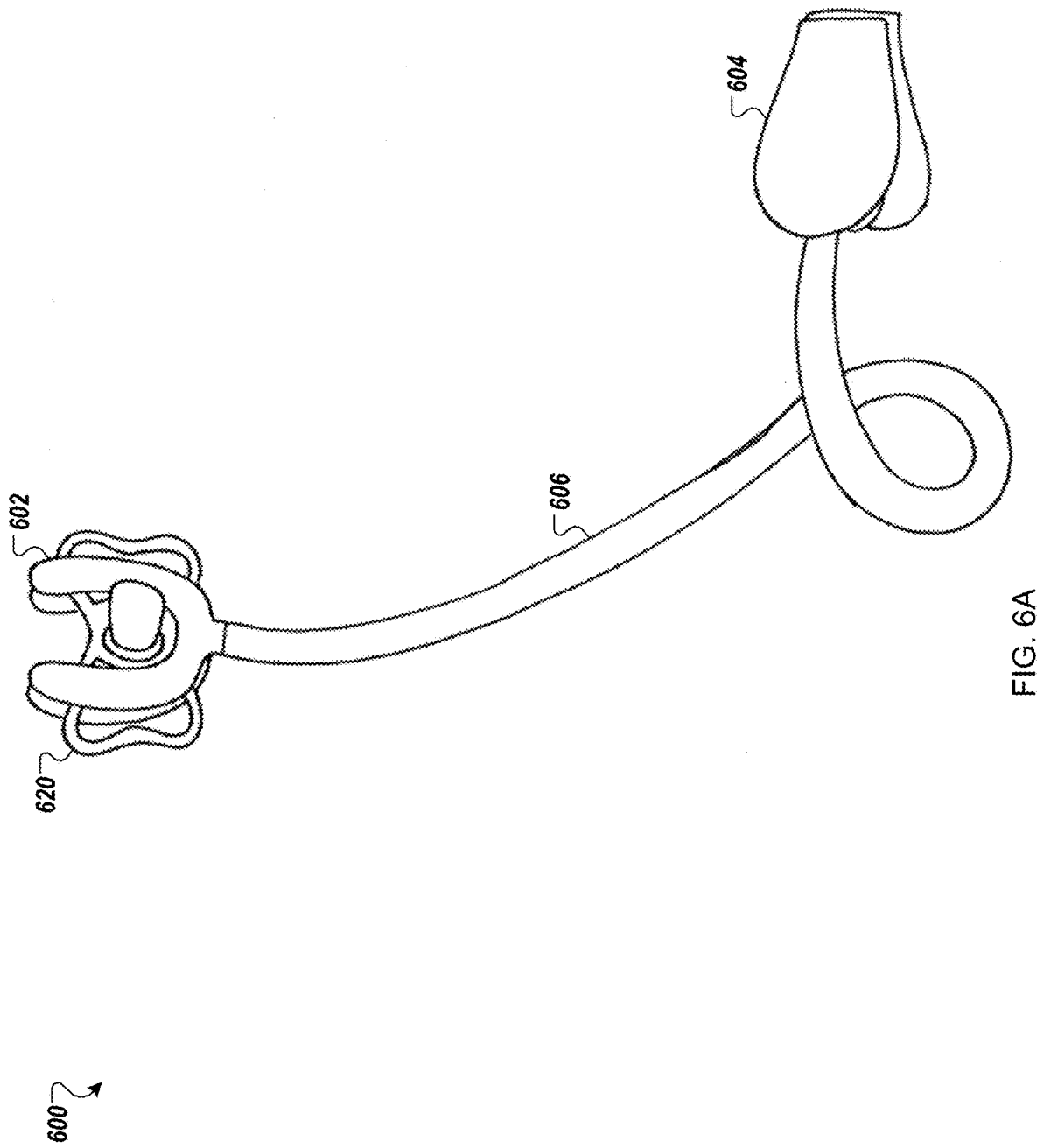
FIG. 6A is a schematic diagram of an object holder securing an object according to one embodiment.

FIG. 6A is a schematic diagram of an object holder 600 securing an object 620 according to one embodiment. The object holder may be the same or similar to the baby-item holder 100 of FIGS. 1A-1C and the baby-item holders 300-500 of FIGS. 3-5 as noted by similar reference numbers. As shown in FIG. 6A, the object holder 600 can include a semi-rigid cable 606, a first clamp 602 connected to a first end of the semi-rigid cable 606, and a second clamp 604 connected to a second end of the semi-rigid cable 606, the second end being opposite the first end. The semi-rigid cable 606 may be a gooseneck cable, a formable cable, a pliable cord, or the like. The second clamp 604 can connect the object holder to a structure. In particular, the second clamp 604 may be a spring clamp configured to clamp to a baby stroller, a baby car seat, a crib, a baby bouncer, or the like. The first clamp 602 can have a U-shape, including a first arm and a second arm to secure the object. The semi-rigid cable 606 can hold the first clamp 602 and the second clamp 604 in a substantially fixed configuration under the weight of the object 620. The substantially fixed configuration may be described with respect to the second clamp 604. The object 620 may have an irregular shape, such as a pacifier (as depicted), a baby toy, a baby bottle, or other objects.

The semi-rigid cable 606, which can be a gooseneck tubing, can further hold the first clamp 602 and the second clamp 604 in a second substantially fixed configuration, which is different than the first substantially fixed configuration, for example, by bending or molding the semi-rigid cable 606. In particular, the semi-rigid cable 606 may be configured to position the object 620 proximate to a mouth area of a baby.

Figure 6B:
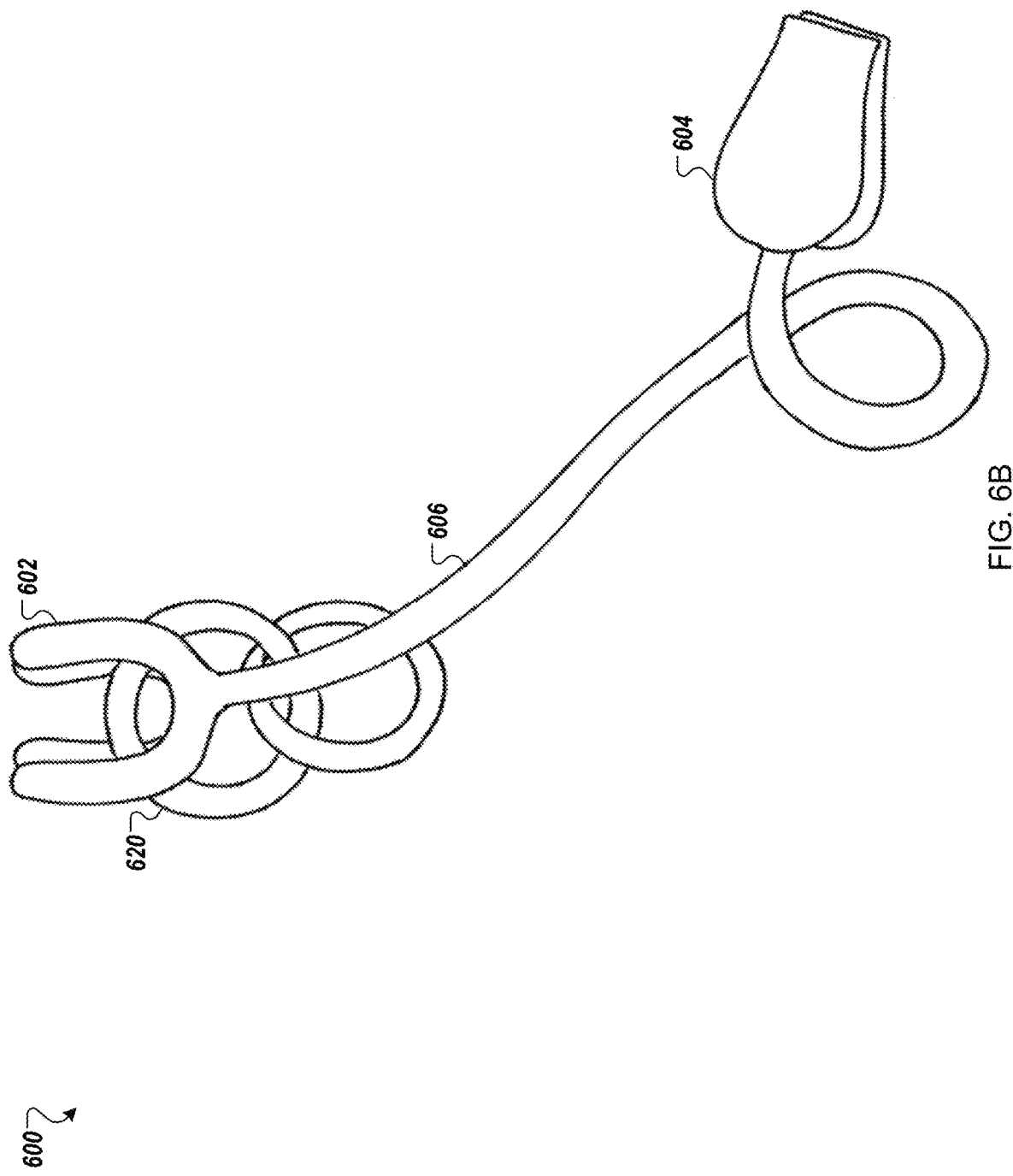
FIG. 6B is a schematic diagram of the object holder securing an object according to one embodiment.

FIG. 6B is a schematic diagram of the object holder 600 securing an object 620 according to one embodiment. As depicted in FIG. 6B, the object is a baby chew-toy (ring).

Figure 7:
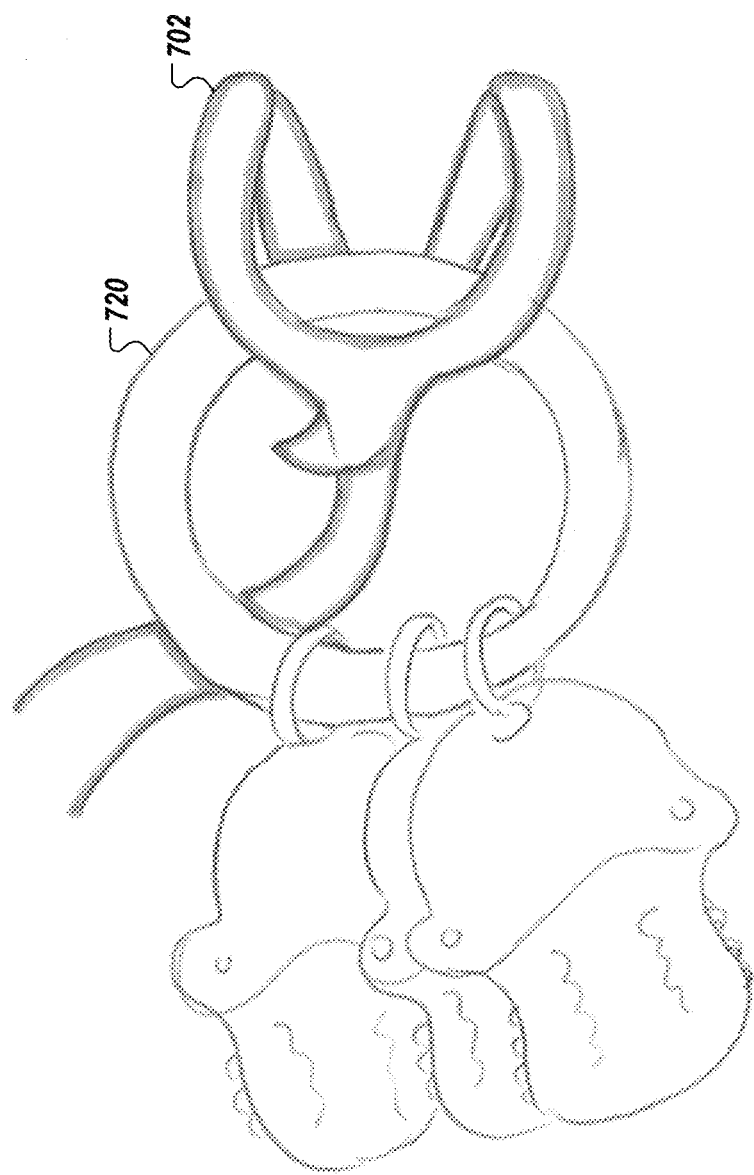
FIG. 7 is a schematic diagram of a baby-item holder securing a baby object according to one embodiment.

FIG. 7 is a schematic diagram of a baby-item holder 700 securing a baby object 720 according to one embodiment. As depicted in FIG. 7, the baby-item is a baby toy (e.g., plastic keys, rattling toys, teething toys, educational toys, dolls, stuffed animals, or the like). In some embodiments, the baby-item holder may be used to secure other devices, such as cell phones, tablets, handheld electronics, or the like, for example, when a baby or toddler may be watching a show/movie or playing games. In some embodiments, the baby-item holder 700 may be configured to organize and secure other devices, such as oxygen tanks, cords, cables, monitors, and the like, for example, when a baby may be sick and require medical monitoring or otherwise. In some embodiments, the baby-item holder may hold the baby object 720 by encompassing the object, rather than securing it (e.g., via friction, as depicted in FIGS. 6A-6B). For example, as depicted in FIG. 7, the baby-item may be prevented from being separated from the first clamp 702, but may also still be free to move within the constraints of the first clamp 702. Such an embodiment may be applicable to some cases in which the baby item has a recess or hole through which one or more parts of the first clamp can be threaded.

Figure 8:
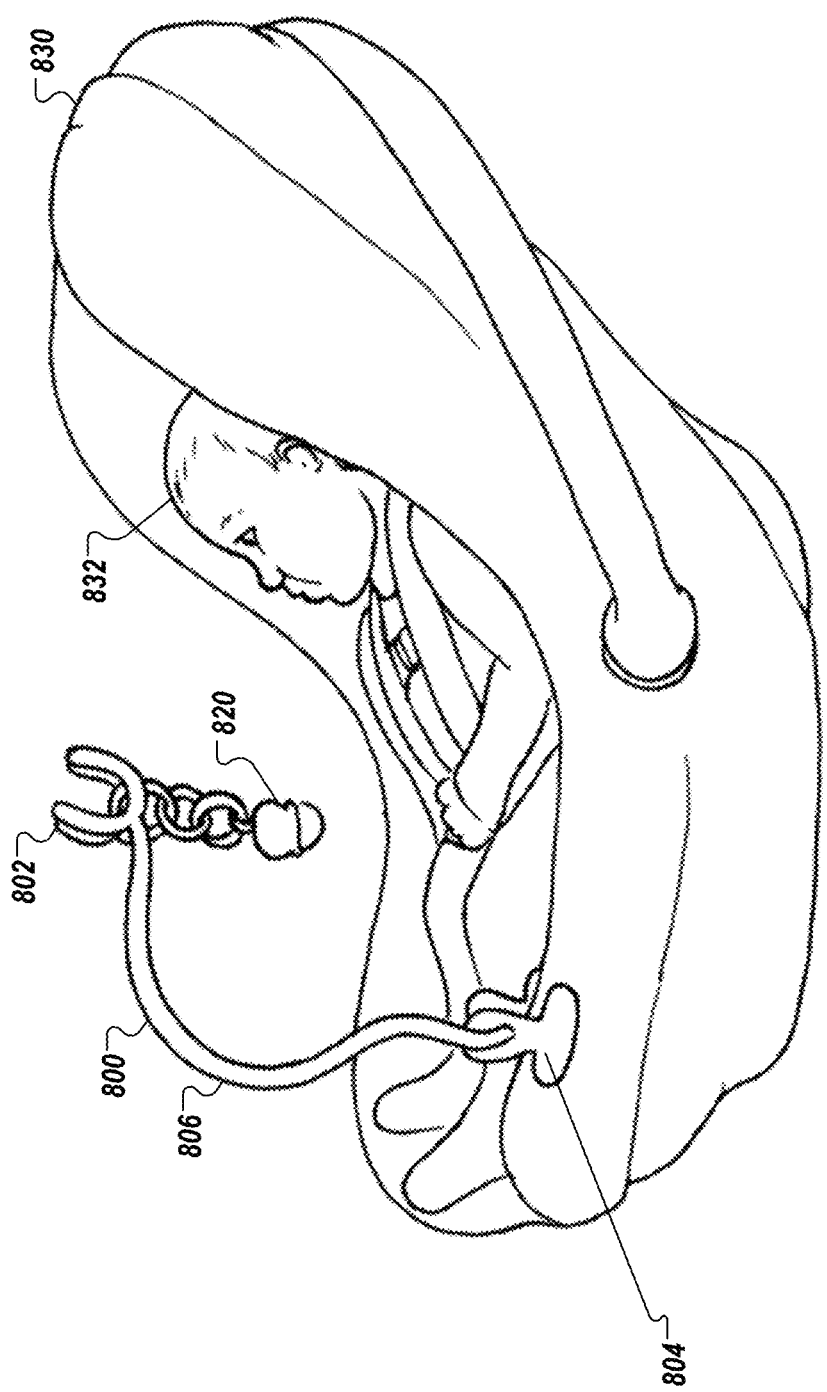
FIG. 8 is an illustration of a baby-item holder attached to a car seat according to one embodiment.

FIG. 8 is an illustration of a baby-item holder 800 attached to a car seat 830 according to one embodiment. The baby-item holder 800 may be the same or similar to the baby-item holders and/or object holders described herein as noted by similar reference numbers. As depicted in FIG. 8, the baby-item holder 800 may be clamped to a position of the car seat 830 by a clamp 804. A clamp 802 may secure a baby item 820. A gooseneck arm 806 fixed between clamps 802 and 804 may be bent to hold the baby item 802 within reach of a baby 832.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. It should be borne in mind, however, that all of these and similar terms are to be associated with the appropriate physical quantities and are merely convenient labels applied to these quantities.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example' or "exemplary" is not necessarily to be construed as preferred or advantageous over other aspects or designs. Rather, the use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc., as used herein, are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A pacifier-securing device comprising:
   a spring clamp to hold a pacifier; and
   a gooseneck arm connected to the spring clamp, wherein:
      the spring clamp comprises a first arm and a second arm separated by a gap in a longitudinal direction between the first arm and the second arm, such that a mouth shield of the pacifier is held in place by a force exerted by the spring clamp in a transverse direction substantially perpendicular to the longitudinal direction, a handle of the pacifier protrudes from the spring clamp along the transverse direction, and an elongated teat of the pacifier protrudes from the spring clamp in the transverse direction opposite the handle; and
      the gooseneck arm holds the spring clamp in a substantially fixed configuration under a weight of the pacifier, wherein the spring clamp comprises:
      a connector base coupled to the gooseneck arm;
      a first U-shaped member coupled to the connector base at a first base of the first U-shaped member, the first U-shaped member comprising the first arm and the second arm; and
      a second U-shaped member coupled to the connector base at a second base of the second U-shaped member, the second U-shaped member comprising a third arm and a fourth arm, wherein the first and second arms of the first U-shaped member and the third and fourth arms of the second U-shaped member extend out from the connector base and taper towards each other at distal ends of the first U-shaped member and the second U-shaped member.

2. The pacifier-securing device of claim 1, wherein the gooseneck arm is configured to secure the pacifier proximate to a mouth area of a baby.

3. The pacifier-securing device of claim 1, further comprising an attachment device connected to the gooseneck arm at a first end, wherein the spring clamp is connected to the gooseneck arm at a second end opposite the first end.

4. The pacifier-securing device of claim 3, wherein the attachment device comprises one of a spring clamp, a clasp, or a buckle.

5. A baby-item holder comprising:
a positioning arm comprising flexible tubing;
a first clamping device connected to a first end of the positioning arm, the first clamping device to secure a baby item and the positioning arm to position the baby item within reach of a baby; and
a second clamping device connected to a second end of the positioning arm, the second end being opposite the first end, wherein the second clamping device is configured to connect the baby-item holder to a structure, wherein the first clamping device comprises:
a connector base coupled to the positioning arm;
a first U-shaped member coupled to the connector base at a first base of the first U-shaped member; and
a second U-shaped member coupled to the connector base at a second base of the second U-shaped member, wherein arms of the first U-shaped member and the second U-shaped member extend out from the connector base and taper towards each other at distal ends of the first U-shaped member and the second U-shaped member.

6. The baby-item holder of claim 5, wherein the connector base is curved between where the first U-shaped member couples to the connector base and where the second U-shaped member couples to the connector base.

7. The baby-item holder of claim 5, wherein the connector base comprises a spring.

8. The baby-item holder of claim 7, wherein the spring is one of a torsion spring, a spiral spring, a compression spring, or a leaf spring.

9. The baby-item holder of claim 5, wherein the first U-shaped member has a first curvature and the second U-shaped member has a second curvature.

10. The baby-item holder of claim 5, wherein the first U-shaped member comprises the first base, a first arm, and a second arm that collectively form the first U-shaped member, wherein the second U-shaped member comprises the second base, a third arm, and a fourth arm that collectively form the second U-shaped member, wherein the first base and the second base are separated by a first distance, the first arm and the third arm are separated by a second distance, and the second arm and the fourth arm are separated by the second distance, and wherein the second distance is less than the first distance.

11. The baby-item holder of claim 10, wherein the first U-shaped member further comprises a first protrusion extending distally away from the first base, the second U-shaped member further comprises a second protrusion extending distally away from the second base, and a distance between a distal end of the first protrusion and a distal end of the second protrusion is greater than the first distance.

12. The baby-item holder of claim 10, wherein the second distance is approximate to a width of the baby item to secure the baby item.

13. The baby-item holder of claim 5, wherein the positioning arm is coated by at least one of silicone, rubber, rope, plastic beads, or wooden beads.

14. The baby-item holder of claim 5, wherein the baby item is a pacifier or a baby toy.

15. The baby-item holder of claim 5, wherein the connector base, the first U-shaped member, and the second U-shaped member are integral.

16. An object holder comprising:
a semi-rigid cable;
a first clamp connected to a first end of the semi-rigid cable; and
a second clamp connected to a second end of the semi-rigid cable, the second end being opposite the first end, wherein:
the second clamp is to connect the object holder to a structure;
the first clamp has a first U-shape comprising a first arm and a second arm extending distally away from a base of the first U-shape;
the first clamp has a second U-shape comprising a third arm and a fourth arm extending distally away from a base of the second U-shape;
the first clamp comprises a connector base coupled to the semi-rigid cable and the first U-shape and the second U-shape;
the first U-shape and the second U-shape taper towards each other at distal ends of the first U-shape and the second U-shape;
the first arm and the second arm are to secure an object; and
the semi-rigid cable is to hold the first clamp and the second clamp in a first substantially fixed configuration under a weight of the object, the first substantially fixed configuration being with respect to the second clamp, and the object having an irregular shape.

17. The object holder of claim 16, wherein the semi-rigid cable comprises gooseneck tubing, wherein the first clamp and the second clamp are held in a second substantially fixed configuration by the gooseneck tubing, the second substantially fixed configuration being different than the first substantially fixed configuration.

18. The object holder of claim 17, wherein the object is a pacifier and the first clamp is to secure the pacifier by a mouth shield of the pacifier such that an elongated teat of the pacifier extends perpendicularly from the first clamp, such that the elongated teat can be accessed by a baby.

19. The object holder of claim 17, wherein the semi-rigid cable is configured to position the object proximate to a mouth area of a baby.

20. The object holder of claim 17, wherein the second clamp is a spring clamp configured to clamp to a baby stroller, a baby car seat, a crib, or a baby bouncer.

* * * * *